US010735359B2

(12) United States Patent
Maria et al.

(10) Patent No.: US 10,735,359 B2
(45) Date of Patent: Aug. 4, 2020

(54) METHOD AND APPARATUS FOR DISTRIBUTING CONTENT TO COMMUNICATION DEVICES

(71) Applicant: AT&T MOBILITY II LLC, Atlanta, GA (US)

(72) Inventors: Arturo Maria, Bellevue, WA (US); Al Sedghi, Potomac, MD (US)

(73) Assignee: AT&T Mobility II LLC, Atlanta, GA (US)

(*) Notice: Subject to any disclaimer, the term of this patent is extended or adjusted under 35 U.S.C. 154(b) by 135 days.

(21) Appl. No.: 15/617,606

(22) Filed: Jun. 8, 2017

(65) Prior Publication Data

US 2017/0272391 A1    Sep. 21, 2017

Related U.S. Application Data

(63) Continuation of application No. 14/022,119, filed on Sep. 9, 2013, now Pat. No. 9,705,830.

(51) Int. Cl.
*H04L 12/58* (2006.01)

(52) U.S. Cl.
CPC .............. *H04L 51/10* (2013.01); *H04L 51/14* (2013.01)

(58) Field of Classification Search
CPC ........... H04N 21/2343; H04N 7/17318; H04N 21/47202; H04N 21/25891; H04N 21/6405; H04N 21/6408; H04N 21/234309
See application file for complete search history.

(56) References Cited

U.S. PATENT DOCUMENTS

| 7,181,538 | B2 | 2/2007 | Tam et al. |
| 7,882,528 | B1* | 2/2011 | Taylor ................ H04N 5/44543 725/46 |
| 7,894,833 | B2 | 2/2011 | Sohn et al. |
| 8,126,936 | B1 | 2/2012 | Giblin |
| 8,676,995 | B1* | 3/2014 | Andreasen ......... H04N 21/4227 709/227 |
| 8,817,065 | B1* | 8/2014 | Mo ........................ H04W 4/21 348/14.08 |

(Continued)

FOREIGN PATENT DOCUMENTS

| EP | 1650927 A2 | 4/2006 |
| KR | 20030073459 | 9/2003 |

*Primary Examiner* — Shean Tokuta
(74) *Attorney, Agent, or Firm* — Guntin & Gust, PLC; Mark Wilinski (57) ABSTRACT

A system that incorporates the subject disclosure may perform, for example, operations including receiving a plurality of profiles from a plurality of communication devices, where each of the plurality of profiles comprise a content preference established by users of the plurality of communication devices, receiving content from a plurality of content sources, selecting portions of the content according to the plurality of profiles supplied by the plurality of communication devices, detecting that the portions of the content are not compatible with a multimedia messaging service protocol utilized by the multimedia messaging service server, transcoding the portions of the content to generate transcoded portions of the content that comply with the multimedia messaging service protocol, and broadcasting the transcoded portions of the content to the plurality of communication devices. Other embodiments are disclosed.

20 Claims, 7 Drawing Sheets

(56) References Cited

U.S. PATENT DOCUMENTS

| | | | |
|---|---|---|---|
| 8,849,902 B2* | 9/2014 | Fiatal | H04L 67/42 709/203 |
| 2003/0065802 A1 | 4/2003 | Vitikainen et al. | |
| 2004/0001081 A1* | 1/2004 | Marsh | H04H 60/46 715/721 |
| 2004/0117459 A1 | 6/2004 | Fry | |
| 2004/0258063 A1 | 12/2004 | Raith et al. | |
| 2005/0159135 A1 | 7/2005 | Kim | |
| 2006/0056419 A1* | 3/2006 | Eichler | H04L 12/66 370/395.52 |
| 2006/0101160 A1 | 5/2006 | Coulombe | |
| 2006/0195506 A1 | 8/2006 | Deng | |
| 2007/0033634 A1* | 2/2007 | Leurs | H04N 7/163 725/143 |
| 2007/0073704 A1* | 3/2007 | Bowden | G06F 16/9535 |
| 2007/0162939 A1 | 7/2007 | Bennett | |
| 2007/0196806 A1 | 8/2007 | Ljungman | |
| 2008/0026779 A1 | 1/2008 | Oh | |
| 2008/0092169 A1* | 4/2008 | Shannon | H04N 5/44543 725/46 |
| 2008/0195664 A1 | 8/2008 | Maharajh et al. | |
| 2008/0207182 A1* | 8/2008 | Maharajh | G06F 17/30035 455/414.1 |
| 2009/0165044 A1* | 6/2009 | Collet | H04N 5/44543 725/38 |
| 2010/0063989 A1* | 3/2010 | Mehta | H04N 21/2343 709/202 |
| 2010/0077438 A1* | 3/2010 | Ansari | H04N 7/17318 725/91 |
| 2010/0121936 A1* | 5/2010 | Liu | H04N 5/44543 709/217 |
| 2010/0131989 A1* | 5/2010 | Casimere | H04N 21/2393 725/62 |
| 2010/0138892 A1* | 6/2010 | Meuninck | H04N 7/17336 725/148 |
| 2010/0146567 A1* | 6/2010 | Mehta | H04N 7/17318 725/91 |
| 2010/0287585 A1 | 11/2010 | Frondal et al. | |
| 2011/0021178 A1 | 1/2011 | Balasaygun et al. | |
| 2011/0225151 A1 | 9/2011 | Annambhotla et al. | |
| 2013/0013688 A1* | 1/2013 | Wang | H04L 61/1541 709/204 |
| 2013/0174035 A1* | 7/2013 | Grab | H04N 21/4316 715/716 |
| 2013/0263184 A1* | 10/2013 | Melnychenko | H04N 21/482 725/50 |
| 2013/0326080 A1 | 12/2013 | Kenzior et al. | |
| 2013/0332838 A1* | 12/2013 | Naggar | G06Q 30/06 715/733 |
| 2014/0006951 A1* | 1/2014 | Hunter | H04H 60/31 715/719 |
| 2014/0038514 A1* | 2/2014 | Robbins | H04N 21/4122 455/3.06 |
| 2014/0164507 A1* | 6/2014 | Tesch | H04L 51/10 709/204 |
| 2014/0215018 A1* | 7/2014 | Lam | H04L 63/108 709/219 |
| 2014/0270700 A1* | 9/2014 | Dhanasamsombat | G11B 27/102 386/241 |

* cited by examiner

METHOD AND APPARATUS FOR DISTRIBUTING CONTENT TO COMMUNICATION DEVICES

This application is a Continuation of and claims priority to U.S. patent application Ser. No. 14/022,119, filed Sep. 9, 2013. The contents of the foregoing are hereby incorporated by reference into this application as if set forth herein full. The subject disclosure relates to a method and apparatus for distributing content to communication devices.

FIELD OF THE DISCLOSURE

Background

The use of smart phones and broadband interfaces has increased the frequency of content browsing, content sharing and content downloads. Video content downloads, for example, have given rise to a need for higher bandwidth systems both in wireless and wireline systems. Social networking has also contributed to the need for higher bandwidth networks.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for distributing content to communication devices. Other embodiments are included in the subject disclosure.

One embodiment of the subject disclosure includes method for receiving, by a multimedia messaging service server comprising a processor, a first plurality of profiles from a plurality of content sources, where each of the first plurality of profiles describe a condition for broadcasting content provided by the plurality of content sources to the multimedia messaging service server, and where content provided by the plurality of content sources is not compliant with a multimedia messaging service protocol utilized by the multimedia messaging service server, receiving, by the multimedia messaging service server, a second plurality of profiles from a plurality of communication devices, where each of the second plurality of profiles indicate a type of content and a content format desired by users of the plurality of communication devices, receiving, by the multimedia messaging service server, content from the plurality of content sources, extracting, by the multimedia messaging service server, portions of the content according to the second plurality of profiles supplied by the plurality of communication devices, transcoding, by the multimedia messaging service server, the portions of the content to generate transcoded portions of the content that comply with the multimedia messaging service protocol utilized by the multimedia messaging service server, and broadcasting, by the multimedia messaging service server, to the plurality of communication devices the transcoded portions of the content according to the first plurality of profiles supplied by the plurality of content sources.

One embodiment of the subject disclosure includes a multimedia messaging service server having a memory to store executable instructions, and a processor coupled to the memory. Responsive to executing the instructions, the processor performs operations including receiving a plurality of profiles from a plurality of communication devices, where each of the plurality of profiles indicate a type of content and a content format desired by users of the plurality of communication devices, receiving content from a plurality of content sources, selecting portions of the content according to the plurality of profiles supplied by the plurality of communication devices, transcoding the portions of the content to generate transcoded portions of the content that comply with a multimedia messaging service protocol, and broadcasting the transcoded portions of the content to the plurality of communication devices.

One embodiment of the subject disclosure includes a machine-readable medium, including executable instructions, which when executed by a system having a processor, causes the processor to perform operations including receiving a plurality of profiles from a plurality of communication devices, where each of the plurality of profiles comprise a content preference established by users of the plurality of communication devices, receiving content from a plurality of content sources, selecting portions of the content according to the plurality of profiles supplied by the plurality of communication devices, detecting that the portions of the content are not compatible with a multimedia protocol utilized by the system, transcoding the portions of the content to generate transcoded portions of the content that comply with the multimedia protocol, and broadcasting the transcoded portions of the content to the plurality of communication devices.

Figure 1:
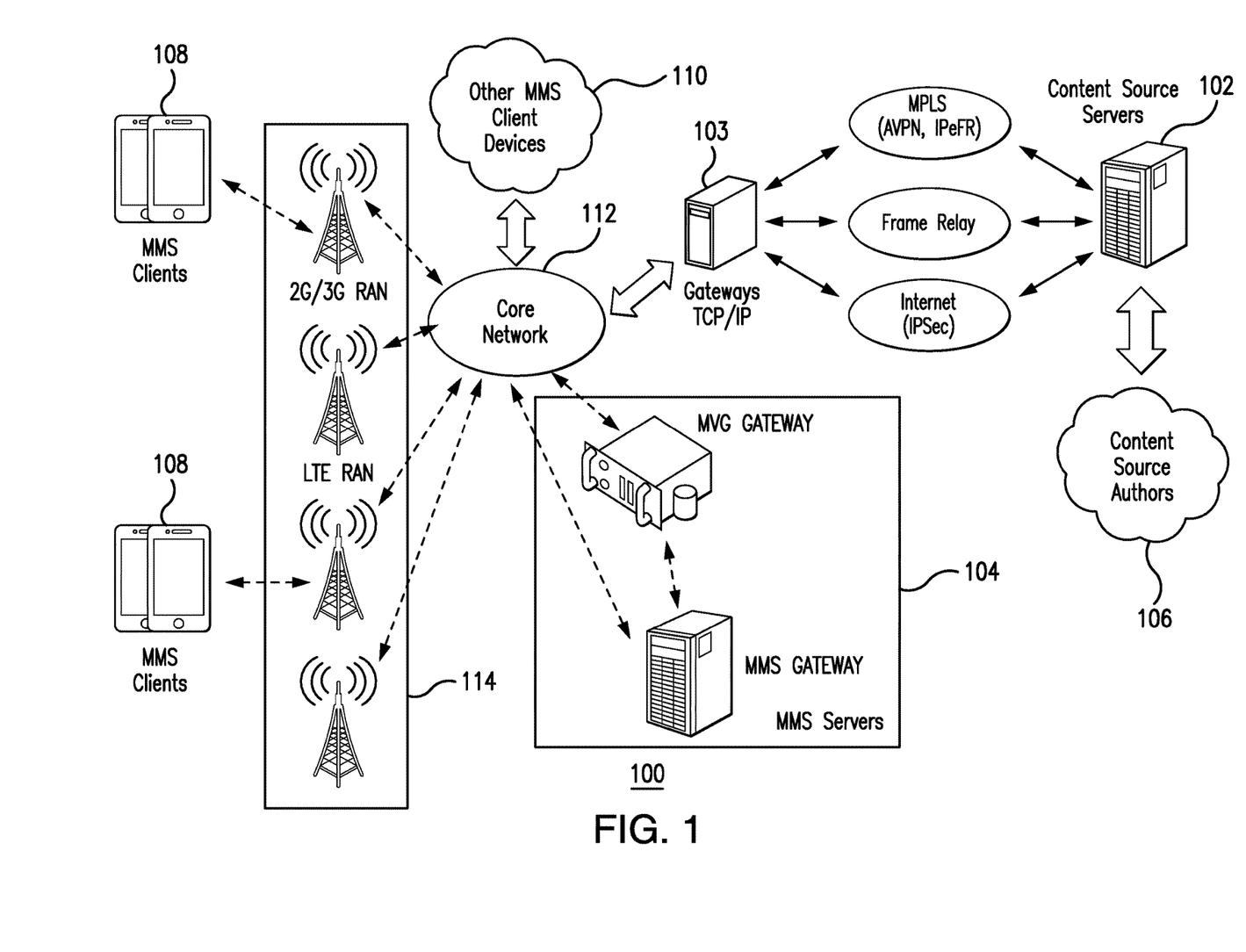
FIG. 1 depicts an illustrative embodiment of a system.
Figure 4:
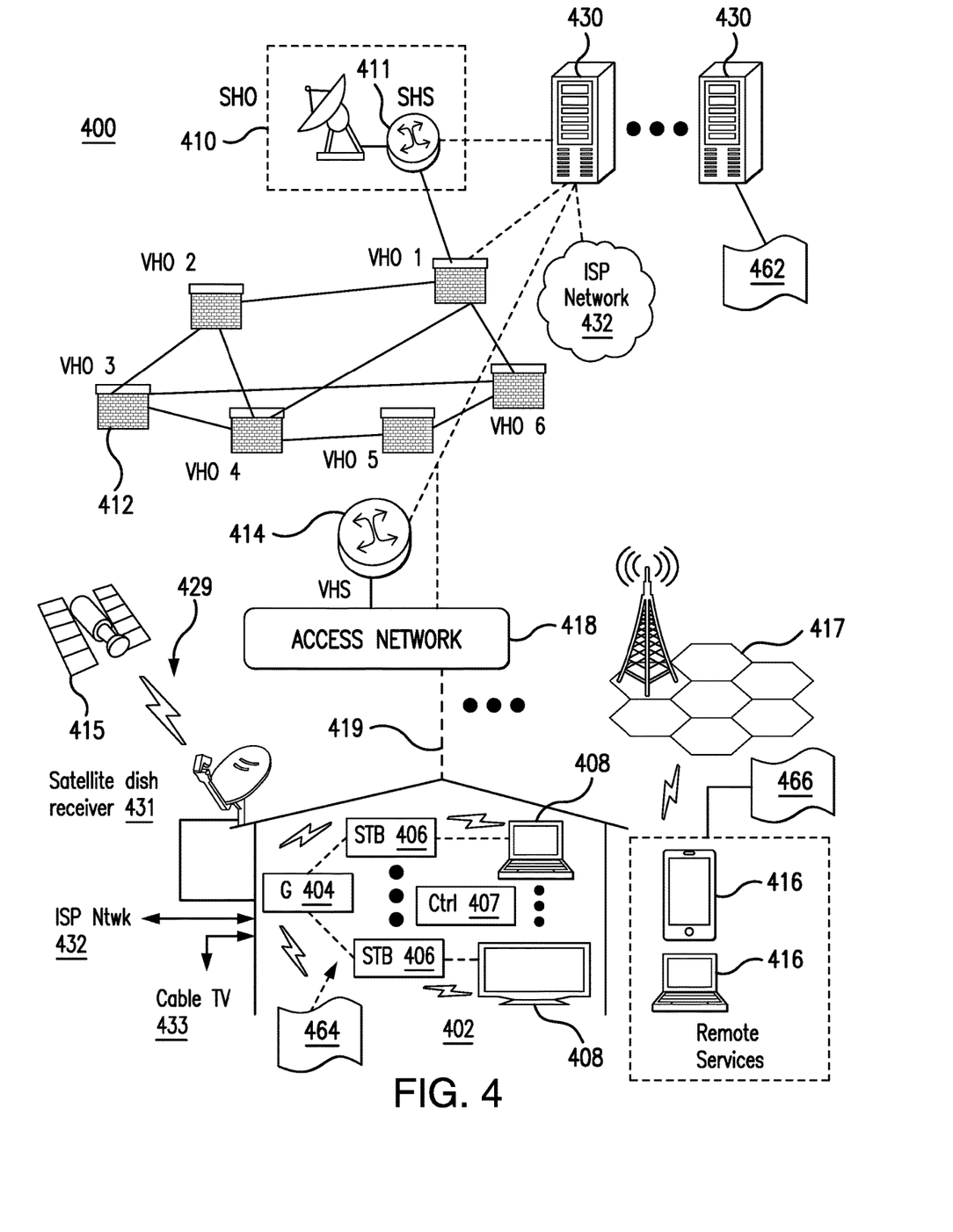
FIGS. 4-5 depict illustrative embodiments of communication systems that provide media services.
Figure 5:
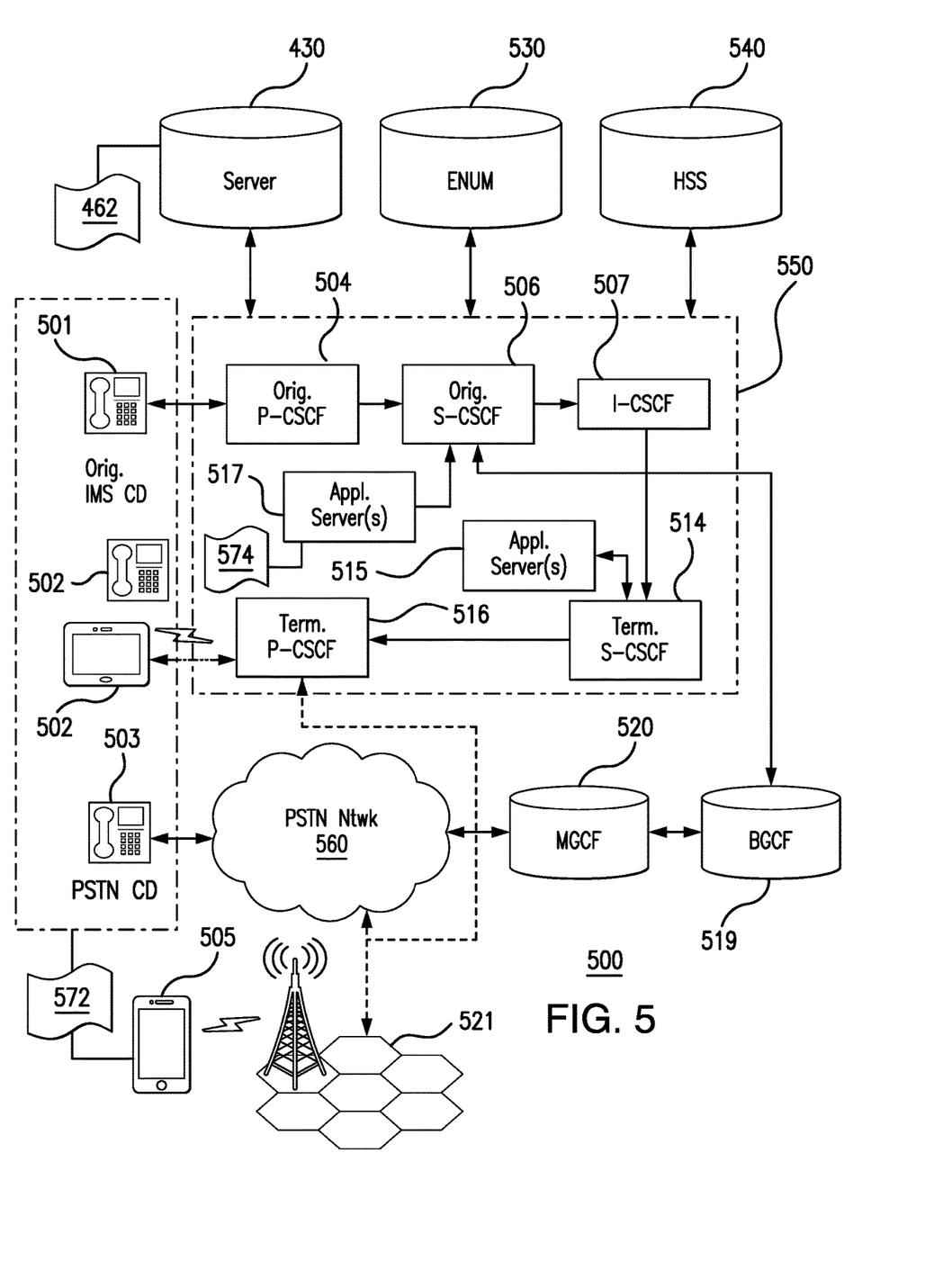

FIG. 1 depicts an illustrative embodiment of a system 100. System 100 can comprise a core network 112 including network elements such as routers and switches for facilitating midrange and long range communications between user equipment. System 100 can also comprise a mobility network 114 including 2G/3G and LTE base stations providing services to mobile communication devices 108 having multimedia messaging service (MMS) capability among other features. The core network 112 can also be coupled to other MMS client devices that utilize land-based wired interfaces for communications such as an Internet interface (e.g., DSL, cable, etc.), Internet Protocol Television (IPTV such as shown in FIG. 4), IP Multimedia Subsystems (IMS such as shown in FIG. 5), and so on. The core network 112 can also be coupled to MMS servers 104, and content servers 102 via a gateway 103 coupled to a network to MPLS routers, frame relays, and other internet-capable or digital transmission network elements.

Figure 2:
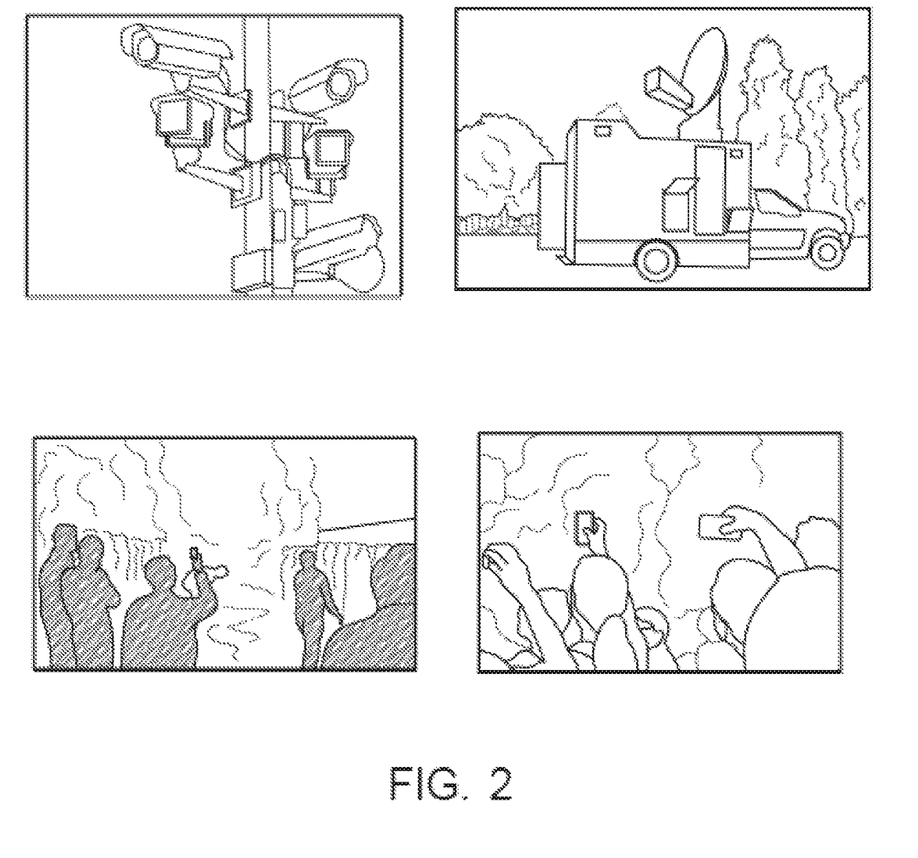
FIG. 2 depicts an illustrative embodiment of sources of content.

The content servers 102 can receive content from content source authors 106 such as fixed cameras located on a public fixture, mobile news crews with satellite equipment to provide a live or prerecorded newscast, mobile users recording newsworthy events, emergency personnel in ambulances carrying communication devices and fire and rescue personnel also carrying communication devices, some of which are shown in FIG. 2. Other sources of authored content suitable for distribution to end user equipment can be applied to the subject disclosure. The content servers 102 provide content distribution services (such as the services provided by LiveCast®, a registered trademark of LCM LiveCast Media, Inc.) to deliver live or prerecorded content between users. The MMS servers 104 can be used to receive, reformat, and redistribute simulcast segments of the content supplied by the content servers 102 as described in the subject disclosure.

Figure 3:
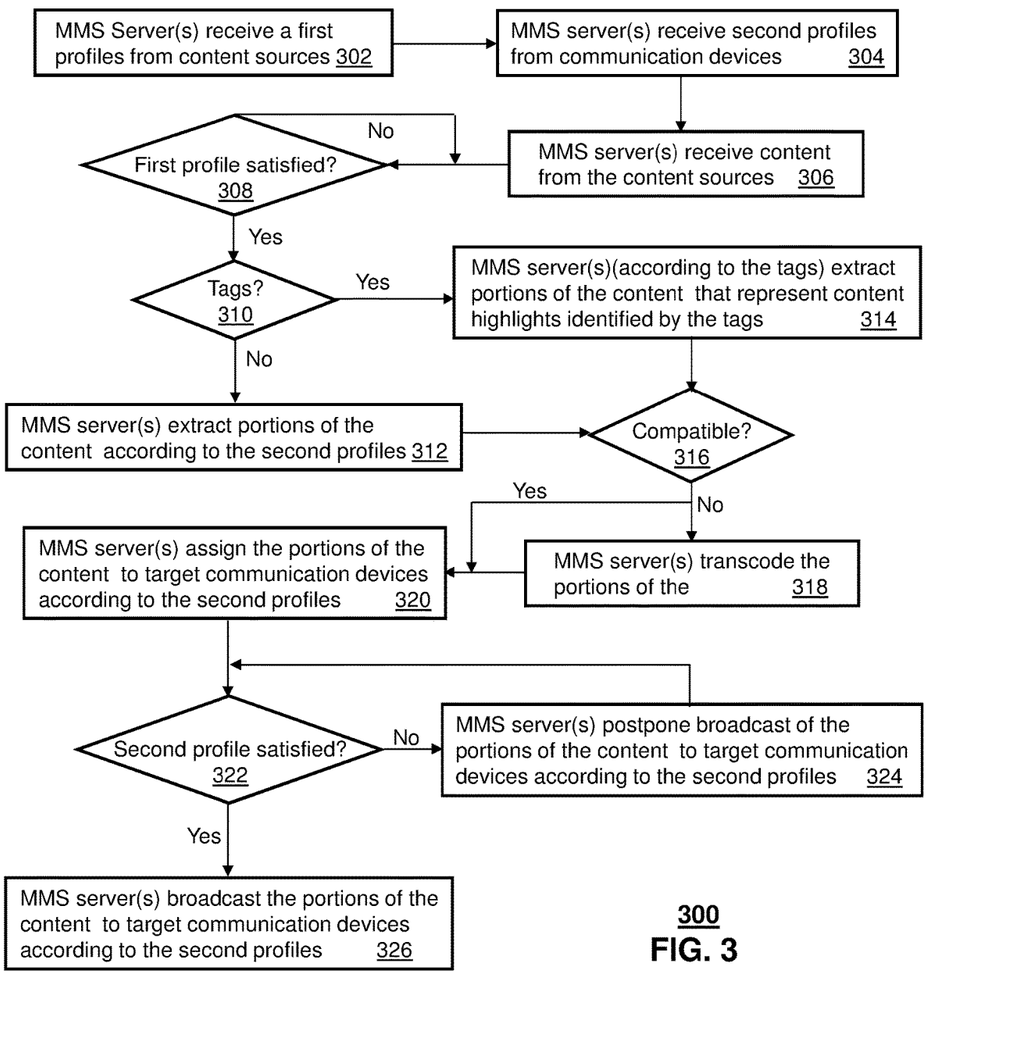
FIG. 3 depicts an illustrative embodiment of a method used in portions of the system described in FIG. 1.

FIG. 3 depicts an illustrative embodiment of a method 300 that can be used in portions of the system 100 described in FIG. 1. Method 300 can begin with step 302 where the MMS servers 104 of FIG. 1 receive first profiles from the content sources 102. The first profiles can describe a condition for broadcasting content provided by the plurality of content sources 102 to the MMS servers 104. For example, the condition can include a time of day for broadcasting the content, rules for distributing content by content type and/or topic, rules for determining which subscribers can receive content collected by the content sources 102, frequency of broadcasting content, and other suitable conditions for determining distribution of content to end users of communication devices 108-110.

At step 304, the MMS servers 104 can receive second profiles from communication devices 108-110 of users targeted as recipients of particular portions of the content collected by the content sources 102. The second profiles can indicate a type of content and a content format desired by users of the plurality of communication devices 108-110. For example, the type of content desired by the users of the plurality of communication devices 108-110 can be described by a genre selection made the users. Genres may include, for example, world news, sports, fashion, gaming, movies, etc. The genre selection can be more specific if desired, e.g., news about a sports team such as the Miami Dolphins, or more specifically news about a specific player of the sports team.

The second profiles can also include a desired transmission period identified by the users of the plurality of communications devices 108-110 for when they wish to receive content supplied by the plurality of content sources 102 at the plurality of communications devices 108-110. The content format desired by the users can be still images (e.g., pictures, or still image clips), or a video clip extracted from the content supplied by the plurality of content sources 102.

The content sources 102 can insert tags in the content to enable organization, identification, and selectivity of the content by the MMS servers 104. For example, the content can be tagged to identify highlights of the content (e.g., a specific scene of interest). The tags can also including identification information or metadata to identify the nature of the content (e.g., news, sports, author of the news or sports, person or persons identified in the content, time of day the content was received, and so on). The tags can also be utilized by the MMS servers 104 to extract portions of the content according to the first profiles provided by the content sources 102 (which may identify target recipients, target time of broadcast, and so on), and the second profiles of the users (which may identify desired content, desired format of the content, user-preferred schedules for reception of the content which may or may not coincide with broadcast times of the content sources 102, and so on).

Once content is received by the MMS servers 104 in step 306 from the content sources 102, the MMS servers 104 can determine if the content complies with the profiles of the content sources 102. For example, the content sources 102 may desire that different portions of the content can have different broadcast times according to the profiles provided by the content sources 102. Rules for distributing content by topic may also differ between content portions to be broadcast at varying times. Similarly, rules for determining which subscribers can receive content collected by the content sources 102, and the frequency of broadcasting between users may differ. Consequently, step 308 may be satisfied at different times for different portions of content and different targeted users/subscribers.

Once the profiles of the content sources 102 have been satisfied for a particular portion of the content received at step 306, the MMS servers 104 can then determine if such portions of content have been sent with tags. Not all content sources 102 may tag their content. If portions of the content include tags, then at step 314, the MMS servers 104 can use the tags to extract segments of content (e.g., video clips, still images, or combinations) that have been highlighted by the content sources 102. Highlights might be, for example, a picture of a sports event showing a player's successful play that led to a touchdown, a winning play, etc. Other highlights may include a video clip of the same play. Other highlights may include just an audio clip of the play. Combinations of highlights may also be possible to provide a recipient of the extracted content options to choose from a number of possible highlights to present at their communication devices 108-110.

If there are no tags, the MMS servers 104 can proceed to step 312 to extract portions of the content according to the profiles provided by the users by way of their communication devices 108-110. In this step, the MMS servers 104 can utilize the identity of the source or author of content to select content of interest, and image and/or audio processing techniques to identify content highlights according to user preferences identified in the second profiles. An identity of the source or author of the content, which can be provided in a header of the content, can be used to identify a type of content. For example, if the source of the content is ESPN, then it is safe to assume the content is sports-related. With image processing and/or audio processing the MMS servers 104 can then search for specific portions of the ESPN content that may be of interest to a user. For example, if the user indicated in the profile s/he is a fan of the Miami Dolphins, and is interested in one or more specific players, then the MMS servers 104 can use image processing and/or audio processing technology to search portions of the content and extract still images and/or clips which may be of interest to the user.

At step 318, the MMS servers 104 can determine whether the extracted content is compliant with an MMS protocol defined by a standards body such as the Open Mobile Alliance. Next generation MMS protocols defined by the same standards body or other standards body can be applied to the subject disclosure. In addition, assessing compliance to the MMS protocol, the MMS servers 104 can determine service provider policies for transmitting content on its networks. For example, the service provider may limit the size and resolution of video clips or the resolution of still images to particular parameters. The MMS servers 104 can further consider the media processing resources of each communication device 108-110 of the users, such as, for example, display size, display resolution, audio processing resources, and so on. The foregoing parameters may require compaction and redaction of extracted content to suit the needs of the service provider of the MMS servers 104 and/or the service provider of the core and mobility networks 112-114, as well as the communication devices 108 of the users. The MMS servers 104 can take into consideration protocol discrepancies, content resolution and size as described above and proceed to step 318 where it transcodes the extracted portions of content to generate transcoded portions that comply with the MMS protocol and the requirements of the service provider(s) and features of the communication devices targeted communication device to receive the transcoded portions.

If there are no incompatibilities, then the transcoding step 318 can be skipped, and the MMS servers 104 can proceed to step 320 where it assigns the extracted portions to target communication devices 108 according to the profiles established by the users of these devices, and/or according to the profiles provided by the content sources 102. Since multiple users can share common interests, the assignment step can result in a shared distribution of extracted portions of the content, which can be distributed in a simulcast transmission to such communication devices 108 using the MMS protocol.

At step 322, the MMS servers 104 can determine if the profiles of the users have been satisfied. This step can represent the desired times set by the users, content type, and so on. Some users may, for example, establish blocked times for preventing reception of content (e.g., no content is to be transmitted between 10 pm and 7 am). Other users may establish priorities and corresponding temporal windows for receiving content. For example, some users may establish a limited window to receive content for a low tier/priority content, while expanding the window for mid-tier/priority content, and making the window unlimited when high tier/priority content is available. Low tier may be, for example, world news, mid tier may be local news, and high tier may be news of specific person(s) or organizations. In cases where the temporal window of a user does not coincide with the broadcast time of a content source 102 as noted in the profile provided thereby, the MMS servers 104 can proceed to step 324 where it postpones the broadcast of the extracted portion(s) of this user until the window of the user occurs. The broadcast can be postponed by storing the extracted (and in some instances transcoded) content, and removing the stored content when the temporal window occurs. For users who's profile has been satisfied, the MMS servers 104 can proceed to step 326 and transmit the extracted portions according to the MMS protocol (which may or may not have been transcoded in step 318).

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. Communication system 400 can be adapted to receive content from content sources and distribute segments of such messages in MMS broadcasts as described in the subject disclosure.

With this in mind, the IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an MMS server (herein referred to as MMS server 430). The MMS server 430 can use computing and communication technology to perform function 462, which can include among other things, the steps described by method 300 of FIG. 3. The media processors 406 and wireless communication devices 416 can be provisioned with software functions 464 and 466, respectively, to utilize the services of MMS server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. Communication system 500 can also be adapted to receive content from content sources and distribute segments of such messages in MMS broadcasts as described by the subject disclosure.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The MMS server 430 of FIG. 4 can be operably coupled to the second communication system 500 for purposes similar to those described above. MMS server 430 can perform function 462 and thereby provide MMS broadcast content services to the CDs 501, 502, 503 and 505 of FIG. 5. CDs 501, 502, 503 and 505, which can be adapted with software to perform function 572 to utilize the services of the MMS server 430. MMS server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
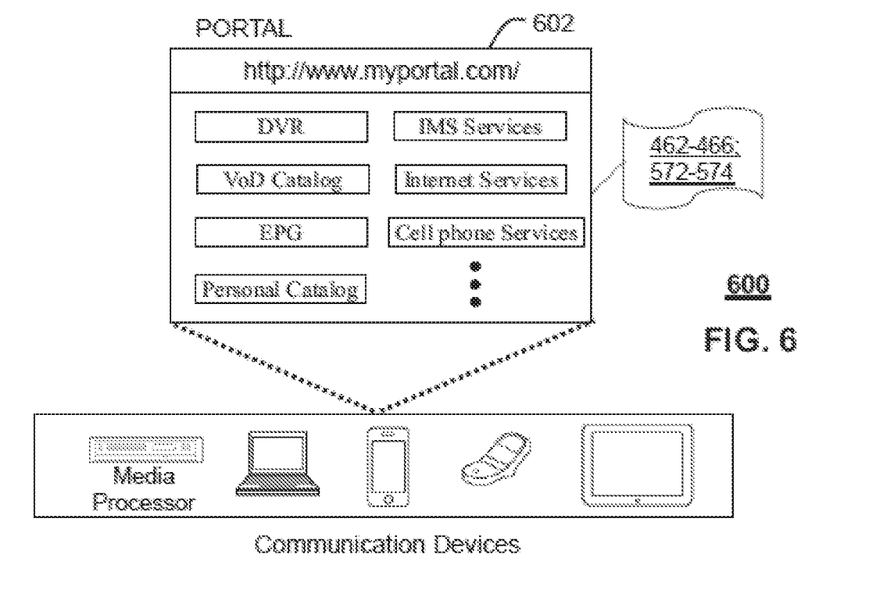
FIG. 6 depicts an illustrative embodiment of a web portal for interacting with the communication systems of FIG. 1, and FIGS. 4-5.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with system 200, communication 400, and/or communication system 500 as another representative embodiment of system 100 of FIG. 1, communication 400, and/or communication system 500. The web portal 602 can be adapted to provide users the ability to create profiles for receiving broadcast content as described above. The web portal 602 can also be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and service providers of communication systems 400-500.

Figure 7:
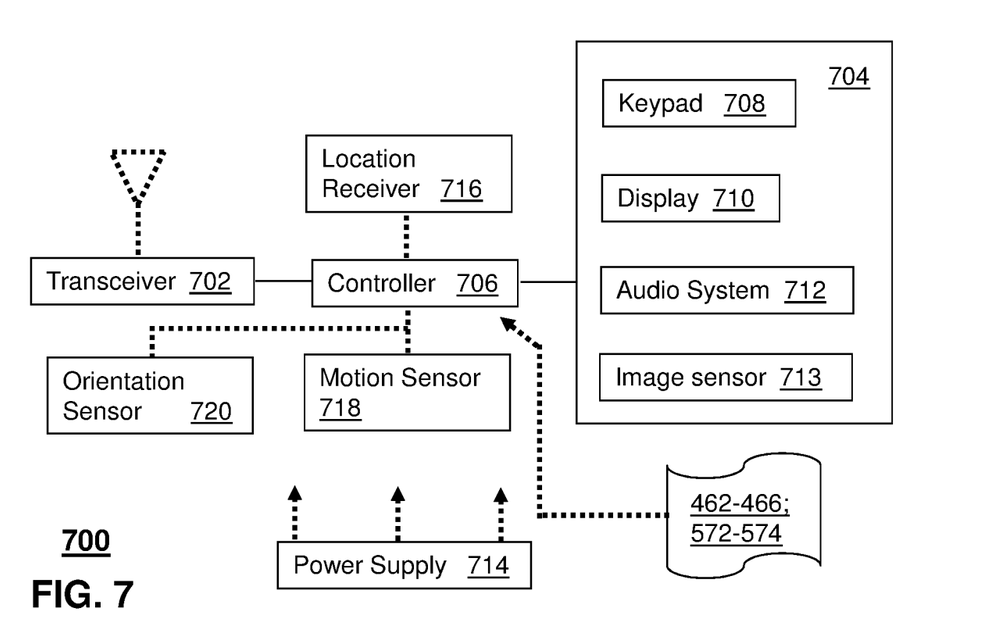
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 4-5. Communication device 700 can be adapted to perform any of the functions described for the devices of FIGS. 1, and 4-5, such as described by method 300 of FIG. 3.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of system 100 of FIG. 1, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, profiles can be received with the content, when the content is transmitted by content sources 102. In this embodiment, the profiles can be determined by the content sources 102 depending on the circumstances surrounding the content in question. For example, if the content relates to real-time news, the content sources may decide that for such content, the profile will require immediate broadcast. For less critical news, the content source 102 may decide to transmit at a convenient time such as after work hours. The aforementioned embodiments can be applied to other applications such as for emergency personnel such as police, fire/rescue, paramedics and hospital personnel. For example, for emergency situations, profiles provided by the content sources 102 can include override codes to expedite delivery by the MMS servers 104. For instance, service provider limits for data size, resolution, and so on can be ignored when override codes are provided in the content source profiles. Additionally, override codes can supersede transmission priority of some or all other content broadcasts. In yet another embodiment, the subject disclosure can be adapted for use by non-MMS systems that can nonetheless serve as broadcast systems such as SMS servers, or other suitable messaging systems. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
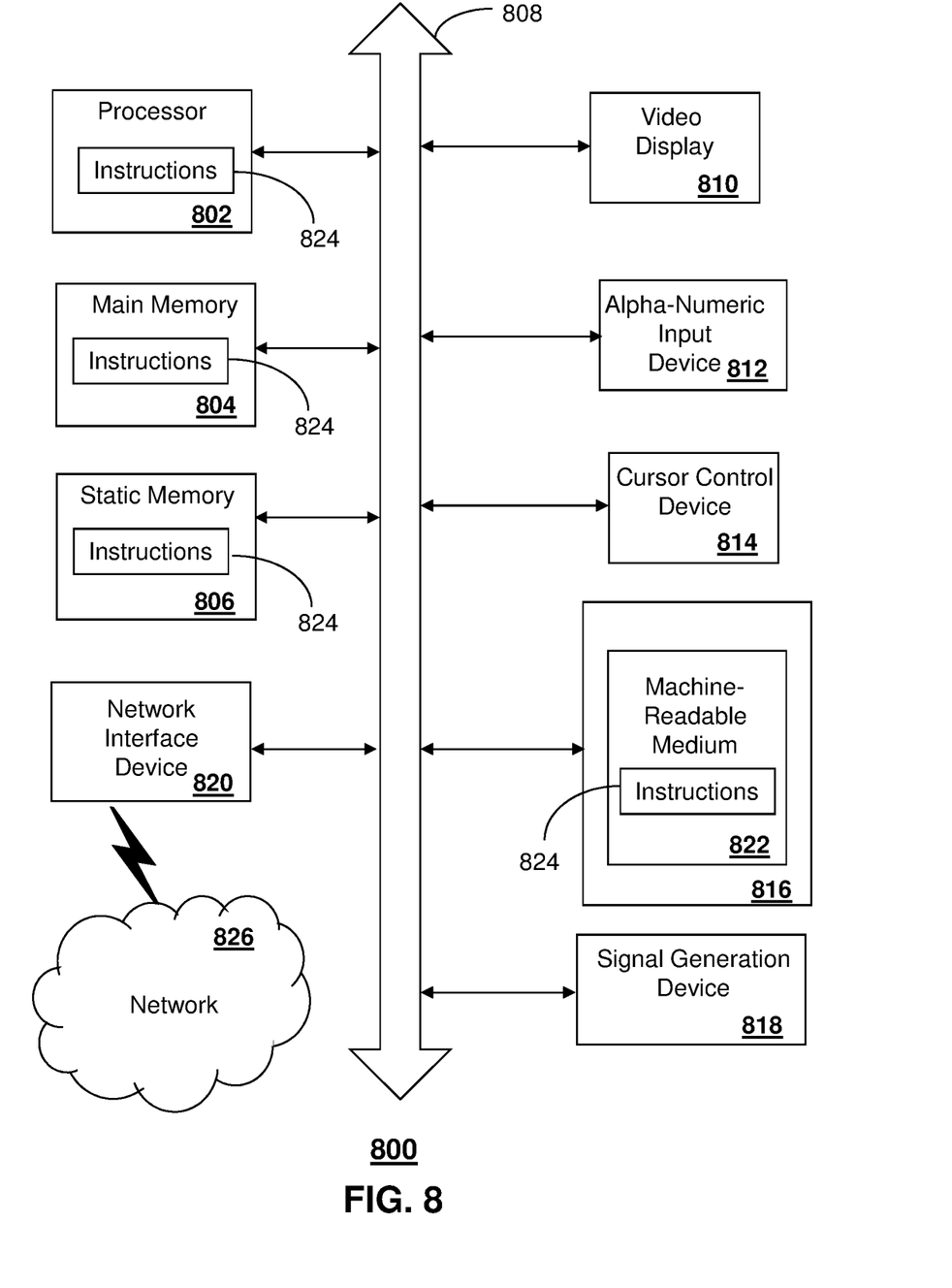
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the MMS server 102, 430, the content source servers 102, the media processor 406, the communication devices 108, 116 and other devices of FIGS. 1, and 4-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a processing system including a processor, a first plurality of profiles from a plurality of communication devices indicating content type and format preferences of users of the plurality of communication devices, wherein the content type and format preferences include preferences for still images, preferences for video clips, or any combination thereof;
   receiving, by the processing system, a second plurality of profiles and first content from a plurality of content sources, wherein each of the second plurality of profiles includes broadcasting conditions that identify a broadcasting time of day and first users of the plurality of communication devices that are authorized to receive broadcasting of content, and wherein the first content comprises live content, mobile device recorded content, and emergency personnel generated content;
   selecting, by the processing system, portions of the first content according to the content type and format preferences of the users of the plurality of communication devices to generate selected portions of the first content; and
   broadcasting, by the processing system, the selected portions of the first content to first communication devices associated with the first users of the plurality of communication devices that are authorized to receive broadcasting of content according to the broadcasting conditions.

2. The method of claim 1, wherein the broadcasting conditions further comprises a day for broadcasting of content, wherein the content type that is desired by the users of the plurality of communication devices includes a genre selection.

3. The method of claim 1, wherein the first content received from the plurality of content sources is supplied by stationary cameras and camera-enabled mobile communication devices.

4. The method of claim 1, further comprising:
   detecting, by the processing system, the selected portions of the first content that are not compliant with a multimedia messaging service protocol to identify non-compliant selected portions; and
   transcoding, by the processing system, the non-compliant selected portions to generate transcoded portions of the first content that comply with the multimedia messaging service protocol, wherein the selected portions that are broadcasted to the first communication devices are the transcoded portions.

5. The method of claim 4, wherein the transcoded portions of the first content are transcoded according to a service provider policy for compacting portions of content, redacting inappropriate segments of content, or any combination thereof.

6. The method of claim 1, wherein each of the first plurality of profiles from the plurality of communication devices further includes a transmission period indicating a desired time for the users of the plurality of communication devices to receive the first content supplied by the plurality of content sources.

7. The method of claim 6, wherein the first content is received from the plurality of content sources prior to the transmission period for a portion of the users of the plurality of communication devices; and further comprising postponing, by the processing system, the broadcasting for the portion of the users of the plurality of communication devices until the transmission period.

8. The method of claim 1, wherein each of the first plurality of profiles further includes a preferred content source of the plurality of content sources established by each of the users of the plurality of communication devices.

9. The method of claim 1, wherein the first content includes tags that identify specific scenes of the first content.

10. The method of claim 9, wherein the selected portions of the first content are selected from the first content according to the tags included in the first content and the first plurality of profiles supplied by the plurality of communication devices.

11. The method of claim 1, wherein the first content includes tags that identify only an audio clip, and wherein the selected portions of the first content include the audio clip.

12. A device, comprising:
   a processing system including a processor; and
   a memory that stores executable instructions that, when executed by the processing system, facilitate performance of operations, comprising:
   transmitting a profile to a multimedia messaging service server indicating content type and format preferences of a user of the device, wherein the content type and format preferences include preferences for still images, preferences for video clips, or any combination thereof; and
   receiving a portion of content that is broadcast from the multimedia messaging service server according to broadcast conditions, wherein the multimedia messaging service server selects the portion of the content according to the content type and format preference of the user of the device, wherein the multimedia messaging service server determines if the user of the device is authorized to receive the broadcast of the portion of the content according to the broadcast conditions, wherein the broadcast conditions comprise a time of day for broadcasting of content, wherein the portion of the content comprises live content, mobile device recorded content, and emergency personnel generated content, and wherein the broadcast conditions are included in each of a plurality of profiles that the multimedia messaging service server receives from a plurality of content sources.

13. The device of claim 12, wherein the operations further comprise presenting the portion of the content that is received.

14. The device of claim 12, wherein the multimedia messaging service server detects that the portion of the content is not compliant with a multimedia messaging service protocol and transcodes the portion of the content to generate a transcoded portion of the content that complies with the multimedia messaging service protocol, and wherein the multimedia messaging service server broadcasts the transcoded portion to the device.

15. The device of claim 12, wherein the content includes tags that identify specific scenes of the content, and wherein the multimedia messaging service server selects the portion of the content according to the tags included in the content and the profile.

16. The device of claim 12, wherein the content includes tags that identify specific scenes of the content, and wherein the portion of the content is selected from the content by the multimedia messaging service server according to the tags included in the content and the profile.

17. The device of claim 12, wherein the portion of content includes only a respective audio clip associated with each of the live content, the mobile device recorded content, and the emergency personnel generated content.

18. The device of claim 17, wherein the operations further comprise presenting the respective audio clip associated with each of the live content, the mobile device recorded content, and the emergency personnel generated content.

19. A non-transitory machine-readable storage medium, comprising executable instructions that, when executed by a processing system including a processor, facilitate performance of operations, comprising:

receiving a first plurality of profiles from a plurality of communication devices indicating content type and format preferences of users of the plurality of communication devices;

receiving first content and a second plurality of profiles, wherein each of the second plurality of profiles includes broadcasting conditions that identify a broadcasting time of day and first users of the plurality of communication devices that are authorized to receive broadcasting of content, and wherein the first content comprises live content, mobile device recorded content, and emergency personnel generated content;

selecting portions of the first content according to the content type and format preferences of the users of the plurality of communication devices to generate selected portions of the first content; and broadcasting the selected portions of the first content to first communication devices associated with the first users of the plurality of communication devices, wherein the first communication devices are authorized to receive broadcasting of content according to the broadcasting conditions.

20. The non-transitory machine-readable storage medium of claim 19, wherein the content type and format preferences include preferences for still images, preferences for video clips, or any combination thereof.

\* \* \* \* \*